(12) United States Patent
Venkatesh et al.

(10) Patent No.: US 9,059,835 B1
(45) Date of Patent: Jun. 16, 2015

(54) METHOD AND APPARATUS FOR DEMODULATING A WIRELESS SIGNAL

(71) Applicant: Marvell International Ltd., Hamilton (BM)

(72) Inventors: Swaroop Venkatesh, Dublin, CA (US); Vijay Ahirwar, Bhopal (IN)

(73) Assignee: Marvell International Ltd., Hamilton (BM)

( * ) Notice: Subject to any disclaimer, the term of this patent is extended or adjusted under 35 U.S.C. 154(b) by 113 days.

(21) Appl. No.: 13/719,975

(22) Filed: Dec. 19, 2012

Related U.S. Application Data (60) Provisional application No. 61/578,188, filed on Dec. 20, 2011.

(51) Int. Cl.
*H03D 1/00* (2006.01)
*H04L 7/00* (2006.01)

(52) U.S. Cl.
CPC .................................. *H04L 7/0087* (2013.01)

(58) Field of Classification Search
USPC .......................................... 375/319, 329, 344
See application file for complete search history.

(56) References Cited

U.S. PATENT DOCUMENTS

2010/0260291 A1* 10/2010 Hou et al. ..................... 375/319
2011/0188614 A1* 8/2011 Chen et al. .................... 375/330

* cited by examiner

*Primary Examiner* — Eva Puente (57) ABSTRACT

A demodulator for a Bluetooth receiver includes an oversampling module configured to oversample input symbols a first plurality of times to generate a first plurality of oversampled input symbols. A correlating module is configured to correlate a second plurality of adjacent samples of the first plurality of oversampled input symbols with corresponding symbols in a predetermined enhanced data rate (EDR) sync word. Based on the correlation, the correlating module is configured to selectively generate a sync signal indicating that EDR sync has occurred. The second plurality of adjacent samples comprises more samples than one and less than all of the first plurality of oversampled input symbols.

26 Claims, 8 Drawing Sheets

METHOD AND APPARATUS FOR DEMODULATING A WIRELESS SIGNAL

CROSS-REFERENCE TO RELATED APPLICATIONS

This present disclosure claims the benefit of U.S. Provisional Application No. 61/578,188, filed on Dec. 20, 2011. The application referenced above is incorporated herein by reference.

FIELD

The present disclosure relates to wireless receivers, and more particularly to demodulation in Bluetooth wireless receivers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1A:
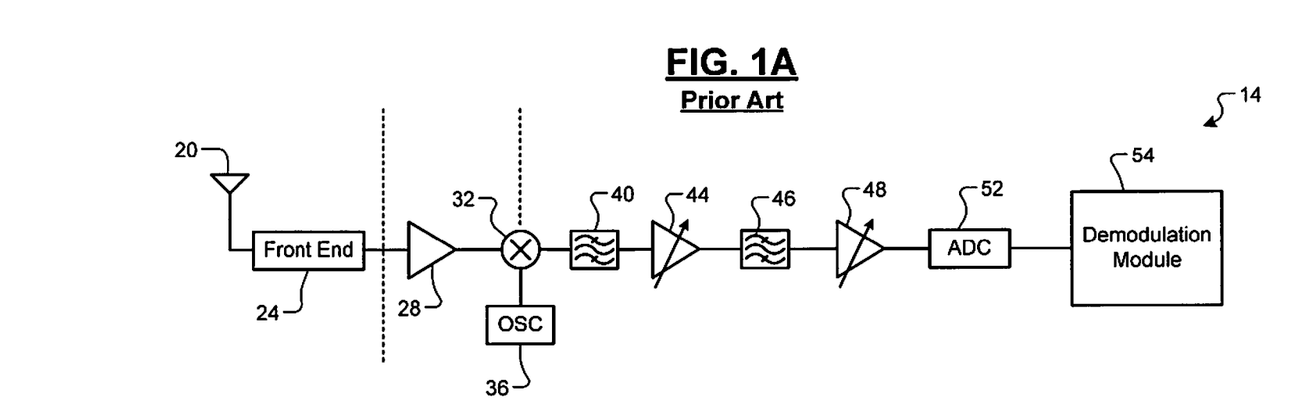
FIG. 1A is a functional block diagram of an example of a Bluetooth receiver according to the prior art.

Bluetooth devices provide connectivity for voice and data between wireless devices. FIG. 1A illustrates an example of a receiver 14 used in a Bluetooth device. The receiver 14 includes an antenna 20 that is connected to a front end module 24. The antenna 20 and the front end module 24 receive analog radio frequency (RF) signals. The analog RF signals output by the front end module 24 are input to a low noise amplifier 28, which amplifies the analog RF signals. A mixer 32 receives the analog RF signals output by the low noise amplifier 28 and an output of an oscillator 36. The mixer 32 converts the analog RF signals to baseband signals.

Further signal conditioning may be performed on the baseband signals. A filter 40 receives an output of the mixer 32. A first variable gain amplifier (VGA) 44 receives an output of the filter 40. A filter 46 receives an output of the VGA 44. A second VGA 48 receives an output of the filter 46. An analog to digital converter (ADC) 52 converts the filtered analog signal to a digital signal. A demodulation module 54 receives the digital signal from the ADC 52 and demodulates the digital signal to recover data bits. The demodulation module 54 may include a square-root-raised-cosine (SRRC) filter (not shown) that is matched to an SRRC filter in a Bluetooth transmitter (not shown).

When operating in a basic data rate (BDR) mode, a symbol rate of the digital signal output by the ADC 52 is 1 MHz with each symbol including one bit. When operating in enhanced data rate (EDR) modes, the symbol rate is 1 MHz, however each symbol represents two or three bits to provide 2 MHz or 3 MHz data rates, respectively.

Figures 1B, 1C:
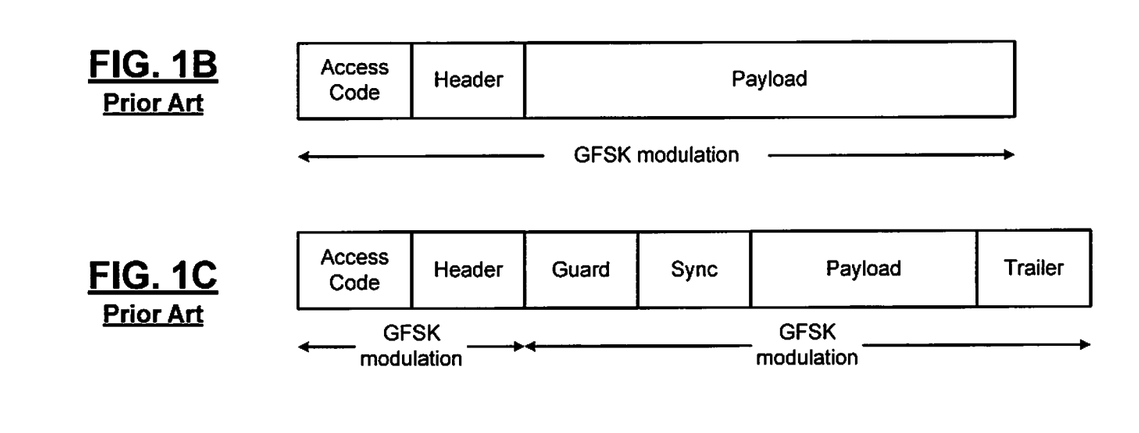
FIG. 1B illustrates fields of an example of a BDR Bluetooth packet according to the prior art.
FIG. 1C illustrates fields of an example of an EDR Bluetooth packet according to the prior art.

FIG. 1B illustrates a BDR packet format, and FIG. 1C illustrates an EDR packet format. In FIG. 1B, the BDR packet begins with an access code and header. The access code is used for synchronization, DC-offset compensation, and identification of packets in a physical channel. Access codes are also used in paging, inquiry, and park operations in a Bluetooth system. The header includes link control information that includes packet type and link type. The link type determines the format of the payload that follows the access code and header. The payload may include user information and control information.

The user information may include data or voice or a combination of the two. The payload may also include control data used for device identity and provide real-time clock information. The payload may also include additional data for error discovery and recovery such as the cyclic redundancy check (CRC) and forward error correction (FEC) information.

The BDR packet in FIG. 1B is transmitted with Gaussian frequency shift keying (GFSK) modulation. The EDR packet in FIG. 1C changes from GFSK modulation to differential phase shift keying (DPSK) after the packet header. As a result, additional timing and control information is required for synchronizing to the new modulation format. The EDR packet uses the same access code and header definitions as the BDR packet, including the modulation format.

Following the header, the EDR packet includes a guard period that allows a receiver time to prepare for the change in modulation to DPSK. The guard time is followed by a synchronization sequence that includes a reference symbol and multiple DPSK symbols. This sequence is required for synchronizing the symbol timing and phase for one of the two modulation types used in the EDR packet. The payload in the EDR packet may include user information and control information based on the type of packet transmitted.

The EDR mode for the 2 Mb/s data rate uses differential-encoded quadrature phase shift keying (DQPSK). The DQPSK signal can be demodulated without estimating the carrier phase. Instead, the phase of a first symbol is compared to the phase of a second symbol. The amount of phase shift is used to estimate the received data.

The EDR mode for the 3 Mb/s data rate uses 8-ary differential encoded phase shift keying (8-DPSK). The further increase in the data rate is achieved through the addition of four more constellation points for each symbol. The total of eight constellation points allows a transmission rate of three bits per symbol. This type of modulation has many of the same benefits as DQPSK including non-coherent demodulation.

Referring back to FIG. 1A, the demodulation module 54 typically uses a Square Root Raised Cosine (SRRCC) filter (not shown) for pulse shaping at the transmitter. The SRRC filter (not shown) in the demodulation module 54 is matched to the SRRC filter used in the transmitter. The SRRC filter cancels intersymbol interference (ISI) at an optimum 1 MHz sampling phase. The demodulation module 54 typically identifies a sync word and performs differential detection. However, the performance or sensitivity of the differential detection approach used by the receiver is limited by incorrect sampling phase selection at power levels around sensitivity. Decision errors after a post slicer may also occur due to in-band noise.

Figure 2:
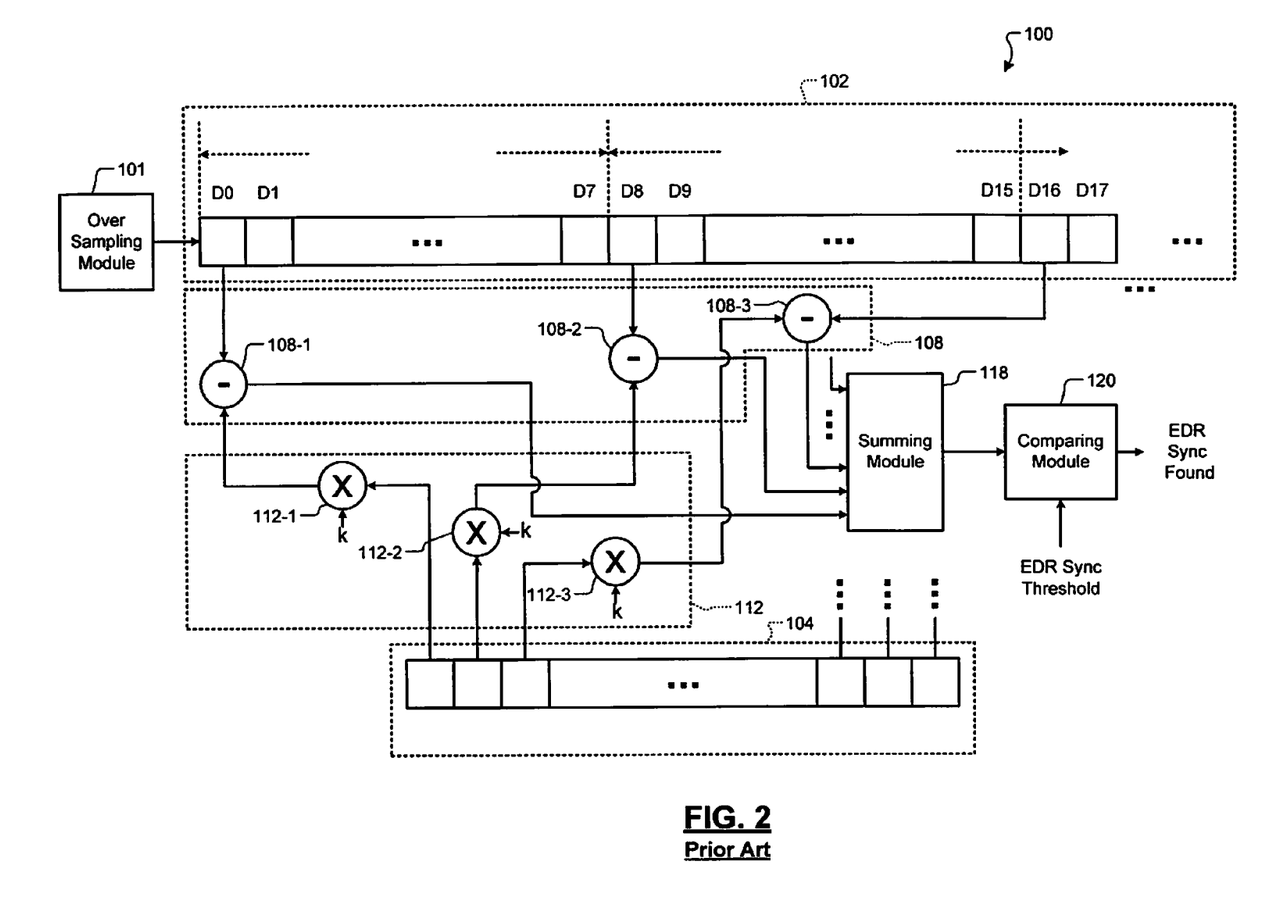
FIG. 2 is a functional block diagram of an example of an EDR sync word detection module according to the prior art.

FIG. 2 illustrates an EDR sync word detection module 100. An oversampling module 101 oversamples each symbol of an input signal T times and stores the oversampled signal in a FIFO buffer 102. For example T=8 in FIG. 2. A register 104 stores a predetermined EDR sync word. The EDR sync word detection module 100 includes a plurality of difference modules 108 and a plurality of multiplier modules 112. A first symbol of the predetermined EDR sync word is multiplied by a constant k in one of the multiplier modules 112-1. For example only, k=0.75, although other values may be used. An output of the multiplier module 112-1 is input to one of the difference modules 108-1. One of the samples (e.g., D0) of one of the symbols of the input signal is also input to the difference module 108-1. An output of the difference module 108-1 is input to a summing module 118.

Likewise, second and third symbols of the predetermined EDR sync word are multiplied by a constant k in the multiplier modules 112-2 and 112-3, respectively. Outputs of the multiplier module 112-2 and 112-3 are input to other ones of the difference modules 108-2 and 108-3, respectively. Other samples (e.g., D8 and D16) of other symbols of the input signal are also input to the difference modules 108-2 and 108-3, respectively. Outputs of the difference modules 108-2 and 108-3 are also input to the summing module 118. Additional symbols of the input signal are compared to other symbols of the predetermined EDR sync word.

The summing module 118 sums the differences generated by the difference modules 108 and outputs the sum to a comparing module 120. The comparing module 120 compares the sum to an EDR sync threshold and selectively generates an EDR sync found signal based on the comparison. For example, the comparing module 120 may generate the EDR sync found signal when the sum of the differences is less than the EDR sync threshold.

Figure 3:
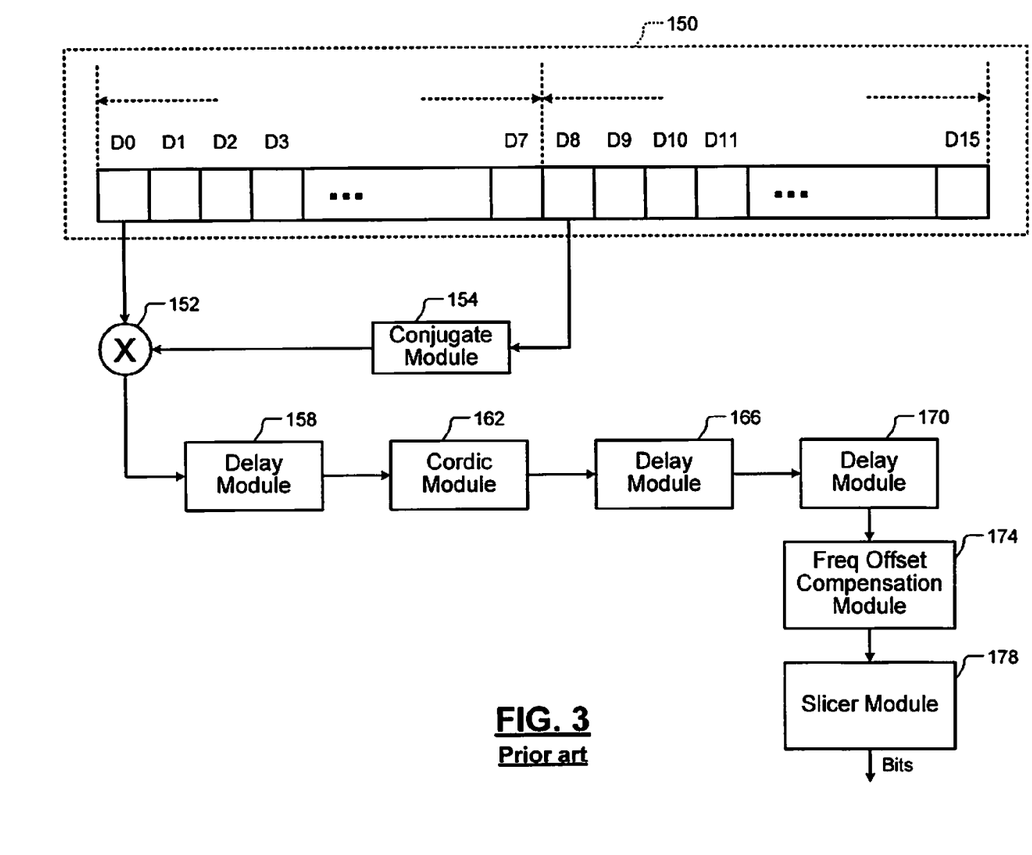
FIG. 3 is a functional block diagram of an example of a differential detection module according to an implementation of the present disclosure.

FIG. 3 illustrates a conventional differential detection module. Oversampled data symbols are received in FIFO buffer 150. A first symbol such as D0 is input to a first input of the multiplier 152. A second symbol such as D8 is input to a conjugate module 154, which provides a conjugate of the second symbol to a second input of the multiplier 152. An output of the multiplier 152 is output to a delay module 158, a coordinate rotation digital computer (cordic) module 162, a delay module 166 and a delay module 170. A frequency offset compensation module 174 receives an output of the delay module 170. An output of the frequency offset compensation module 174 is input to a slicer module 178, which outputs the data bits.

SUMMARY

A demodulator for a Bluetooth receiver includes an oversampling module configured to oversample input symbols a first plurality of times to generate a first plurality of oversampled input symbols. A correlating module is configured to correlate a second plurality of adjacent samples of the first plurality of oversampled input symbols with corresponding symbols in a predetermined enhanced data rate (EDR) sync word. Based on the correlation, the correlating module is configured to selectively generate a sync signal indicating that EDR sync has occurred. The second plurality of adjacent samples comprises more samples than one and less than all of the first plurality of oversampled input symbols.

A demodulator for a Bluetooth receiver includes a differential detection module configured to perform differential detection on a first symbol and a second symbol. The second symbol occurs prior to the first symbol. The differential detection module generates a phase estimate for the first symbol. A symbol replacement module is configured to generate a third symbol based on the phase estimate and the second symbol and to replace the first symbol based on (i) the third symbol and (ii) the first symbol.

A method of performing demodulation in a Bluetooth receiver includes performing differential detection on a first symbol and a second symbol, wherein the second symbol occurs prior to the first symbol; generating a phase estimate for the first symbol; generating a third symbol based on the phase estimate and the second symbol; and replacing the first symbol based on (i) the third symbol and (ii) the first symbol.

A method for performing demodulation for a Bluetooth receiver includes oversampling input symbols a first plurality of times to generate a first plurality of oversampled input symbols; and correlating a second plurality of adjacent samples of the first plurality of oversampled input symbols with corresponding symbols in a predetermined enhanced data rate (EDR) sync word; and based on the correlation, selectively generating a sync signal indicating that EDR sync has occurred. The second plurality of adjacent samples comprises more samples than one and less than all of the first plurality of oversampled input symbols.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 4A:
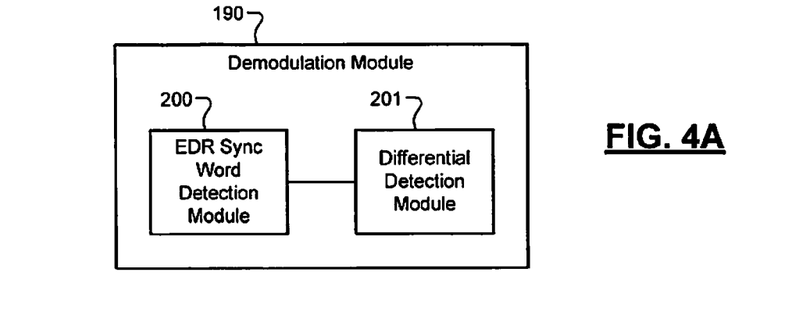
FIG. 4A is a functional block diagram of an example of a demodulation module including an EDR sync word detection module and a differential detection module according to an implementation of the present disclosure.
Figure 4B:
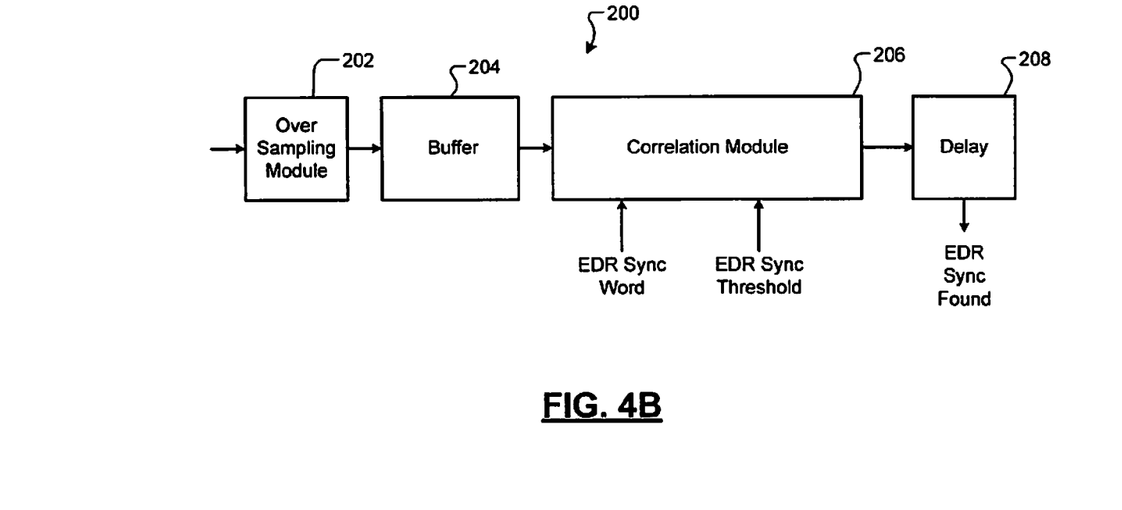
FIG. 4B is a functional block diagram of an example of an EDR sync word detection module according to an implementation of the present disclosure.
Figure 4C:
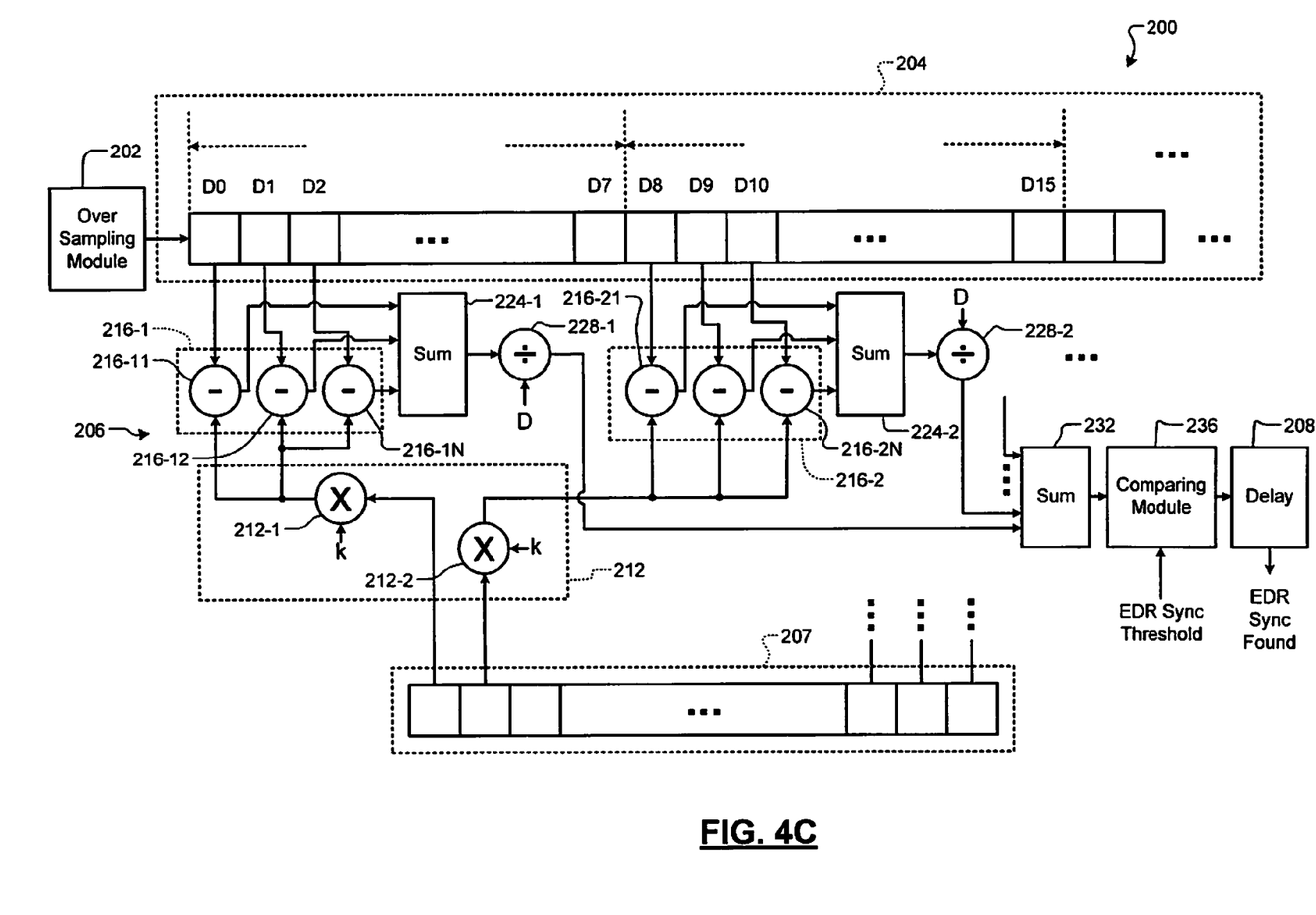
FIG. 4C is a more detailed functional block diagram of an example of an EDR sync word detection module according to an implementation of the present disclosure.
Figure 5:
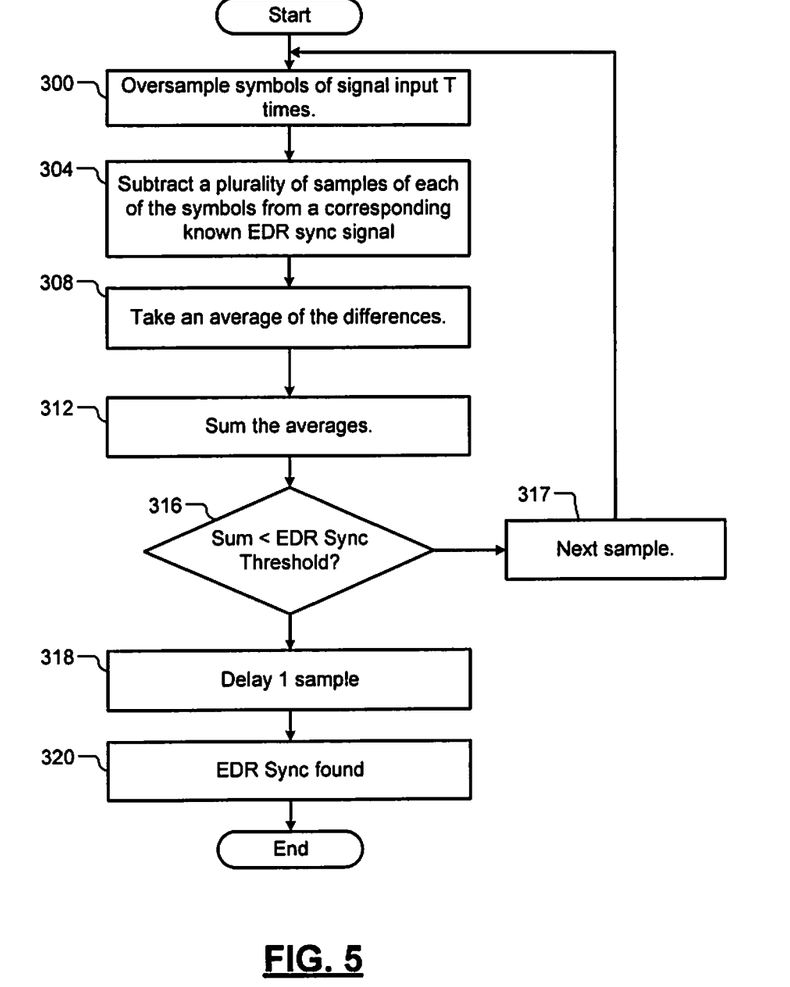
FIG. 5 is a flowchart illustrating an example of a method for detecting an EDR sync word according to an implementation of the present disclosure.
Figure 6:
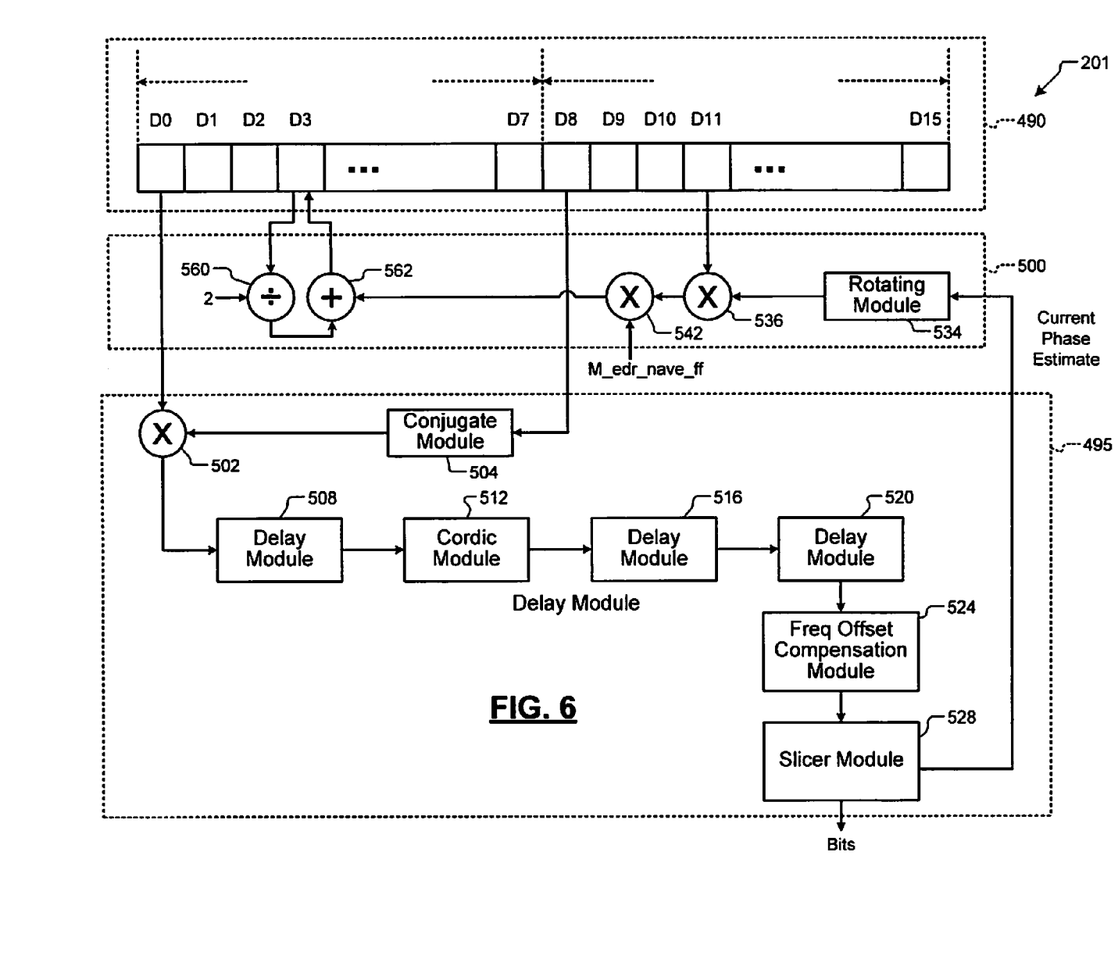
FIG. 6 is a functional block diagram of a differential detection module according to an implementation of the present disclosure.
Figure 7:
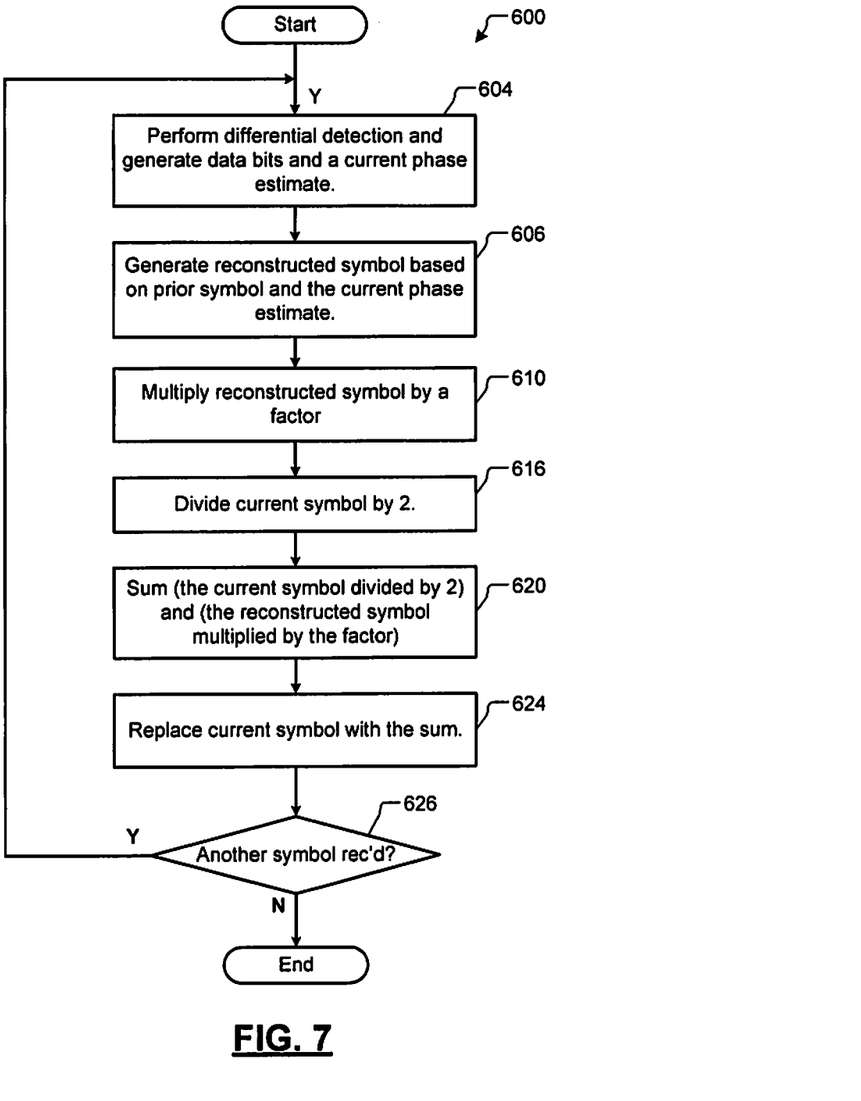
FIG. 7 is a flowchart illustrating an example of a method for differential detection according to an implementation of the present disclosure.

In the foregoing description, FIGS. 4A-5 relate to an EDR sync word detection module of the demodulation module according to an implementation of the present disclosure. FIGS. 6-7 relate to differential detection module of the demodulation module according to an implementation of the present disclosure.

EDR Sync Word Detection Module

The EDR sync word detection module shown in FIG. 2 determines a phase having a minimum distance from the known EDR sync word. The selected phase identified by the EDR sync word detection module is then used during differential detection and/or other processing. High noise on an element of this input vector may cause an erroneous minimum distance calculation with respect to a correct sampling phase.

As described above, the EDR sync word detection module shown in FIG. 2 uses one sample for each oversampled symbol when correlating the input signal to the EDR sync word. As will be described further below, an EDR sync word detection module according to an implementation of the present disclosure uses N adjacent samples for each oversampled symbol when correlating the input signal to the EDR sync word, where N is greater than one and less than four. Averaging using N samples from consecutive sampling phases improves the minimum distance detection. Note that averaging on more than N consecutive sampling phases tends to degrade performance since other phases have large effects of ISI (only the optimal phase and phases close to the optimal phase are relatively ISI free).

FIG. 4A illustrates an example of a demodulation module 190 which, in one implementation, includes an EDR sync word detection module 200 and a differential detection module 201.

FIG. 4B illustrates an example of the EDR sync word detection module 200 according to an implementation of the present disclosure. An oversampling module 202 receives symbols at a symbol rate and oversamples the symbols at an oversampling rate. In some examples, the oversampling rate is T times where T is an integer. In some examples, T=8, the symbol rate is 1 MHz and the oversampling rate is 8 MHz. Therefore there are T samples of each of the symbols in the oversampled input signal. The oversampled input signal is output to a buffer 204 such as a FIFO buffer.

A correlation module 206 selects N adjacent samples of the T samples for each of the symbols, where N is greater than one and less than four. In some examples, N=3. The correlation module 206 generates differences between the N samples of the symbols and corresponding bits in a predetermined EDR sync word. The correlation module 206 sums the differences and generates average differences for the symbols. The correlation module 206 generates a sum of the average differences for the symbols, and compares the sum of the average differences to a predetermined threshold (e.g., an EDR sync threshold). If the sum is less than the EDR sync threshold, the correlation module 206 generates a signal (e.g., an EDR sync found signal) indicating that an EDR sync has been found. Otherwise, the symbols of the input signal are shifted by one symbol in the buffer 204 and the process is repeated for the next symbol until an EDR sync is found. A delay module 208 may be used to provide a 1 sample delay before declaring the EDR sync has been found.

FIG. 4C illustrates a more detailed example of the EDR sync word detection module 200. The oversampling module 202 oversamples each symbol of an input signal T times. A register 207 stores a predetermined EDR sync word. The EDR sync word detection module 200 includes a plurality of multiplier modules 212 and a plurality of difference modules 216-1, 216-2, ... (collectively difference modules 216) each including N difference modules 216-11, 216-12, ..., and 216-1N, where N is an integer greater than 1. In some examples, N=3.

A first symbol of the predetermined EDR sync word is multiplied by a constant k in one of the multiplier modules 212-1. For example k=0.75, although other values may be used. An output of the multiplier module 212-1 is input to each of the N difference modules 216-11, 216-12, ..., and 216-1N in the difference module 216-1. N of the samples (e.g., D0, D1, and D2) of one of the symbols of the input signal are also input to the difference module 216-1. An output of the difference module 216-1 is input to a summing module 224-1. A dividing module 228-1 divides the output of the summing module 224-1 by D, where D is a number such as an integer. In some examples, D=4.

A second bit of the predetermined EDR sync word is multiplied by a constant k in one of the multiplier modules 212-2. An output of the multiplier module 212-2 is input to each of the N difference modules 216-21, 216-22, ..., and 216-2N in the difference module 216-2. N of the samples (e.g., D8, D9, and D10) of one of the symbols of the input signal are also input to the difference module 216-2. An output of the difference module 216-2 is input to a summing module 224-2. A dividing module 228-2 divides the output of the summing module 224-2 by D, where D is a number such as an integer.

Other bits of the predetermined EDR sync word are handled in a similar manner.

Outputs of the dividing modules 228-1, 228-2, ... are input to a summing module 232. The summing module 232 sums the averaged differences and outputs the sum to a comparing module 236. The comparing module 236 compares the sum to an EDR sync threshold and selectively generates an EDR sync found signal based on the comparison. For example, the comparing module 236 may generate the EDR sync found signal when the sum of the differences is less than the EDR sync threshold.

The EDR sync word detection module of FIG. 2 finds the phase having the minimum distance from the known EDR sync word. High noise on an element of this input vector may cause erroneous minimum distance (with respect to a correct sampling phase). Averaging on N points using consecutive sampling phases as shown in FIG. 4B improves the minimum distance detection. Note that averaging on more than N consecutive sampling phases may result in degradation in performance since other phases have large effects of 151 (only an optimal phase and phases close to it are relatively ISI free).

Referring now to FIG. 5, a method of finding a minimum distance to the predetermined EDR sync word is shown. At 300, symbols of the EDR sync signal are oversampled T times. At 304, a plurality of adjacent samples of each of the symbols are subtracted from corresponding bits of a predetermined EDR sync word. At 308, an average of the differences is generated. At 312, the averages are summed. At 316, control determines whether or not the sum is less than an EDR sync threshold. If not, control continues with the next symbol at 317. Otherwise, control delays 1 sample at 318 and declares the EDR sync was found at 320.

Differential Detection Module

At the transmitter, the transmitted signal $$S(n) = e^{j(\Sigma_i \theta(n)) + j\theta_0}$$

passes through a square root raised cosine (SRRC) filter. Successive symbols are equal to a sum of the initial phase $\theta_0$ and the rotation from a subsequent phase. Therefore, for the first three symbol periods, $s[0]=\theta_0$, $s[1]=\theta_0+\theta[1]$, and $s[2]=s[1]+\theta[2]$. $\theta[1]$ is the information carrying part in $s[1]$ that includes bits b1 and b2 for DQPSK and bits b1, b2 and b3 for D8PSK. $\theta[2]$ is the information carrying part in $s[2]$ that includes bits b3 and b4 for DQPSK and bits b4, b5 and b6 for D8PSK.

At the receiver, the received signal is $$r[n] = e^{j(\theta_0 + \Sigma^n \theta_n)}.$$

When performing differential detection, the current signal is multiplied by the past symbols or $r[n]r^*[n-8] \approx e^{j\Theta[n]}$. For example only, the variable n does not correspond to integration at the signal rate such as 1 MHz. Rather, the variable n may correspond to integration at a higher rate such as the sampling rate (which may be 8 MHz). In one implementation, $r[n]=s[n]+z_0[n]$, where $z_0[n]$ is the noise in the first symbol, and $r[n-8]=s[n-8]+z_1[n]$, where $z_1[n]$ represents noise in the past symbols. It would be desirable to significantly reduce or cancel $z_1[n]$.

At the transmitter, the signal sent by the transmitter in four succeeding periods is $\theta_0$, $\theta_0+s_1$, $\theta+s_1+s_2$, and $\theta_0+s_1+s_2+s_3$, where $s_1$, $s_2$, and $s_3$ respectively correspond to the first symbol, the second symbol, and the third symbol. At the receiver, the signal received by the receiver is $\theta_0+n_0$, $\theta_0+s_1+n_1$, $\theta_0+s_1+s_2+n_2$, and $\theta_0+s_1+s_2+s_3+n_3$, where $n_1$, $n_2$, and $n_3$ respectively correspond to the first noise value, the second noise value, and the third noise value. Using differential detection (subtracting the current sample from the prior sample) starting after the second period, we have $s_1+n_1-n_0$, $s_2+n_2-n_1$, and $s_3+n_3-n_2$.

A slicer module is used on the received symbol $s_1+n_1-n_0$ to generate an estimated symbol $\hat{s}_1$. Based on the estimated phase output by the slicer module and the second symbol, a clean reconstruction of the phase of the second transmitted symbol $\theta_0+\hat{s}_1$ is generated. If the clean reconstruction of the phase of the second transmitted symbol value $\theta_0+\hat{s}_1$, is used instead of $\theta+s_1+n_1$ in the next differential detection calculation, the noise term $n_1$ is eliminated—which results in $s_2+n_2$ rather than $s_2+n_2-n_1$.

The slicer module is used on the received symbol $s_2+n_2$ to generate an estimated symbol $\hat{s}_2$. Based on the output of the slicer module, a clean reconstruction of the phase of the second transmitted symbol $\theta_0+\hat{s}_2$ is generated. If the clean reconstruction of the phase of the second transmitted symbol value $\theta_0+\hat{s}_2$ is used in the next differential detection calculation, the noise term $n_2$ is eliminated—which results in $s_3+n_3$ rather than $s_3+n_3-n_2$. Assuming that the symbol estimate output by the slicer module is correct, there will be approximately 3 dB improvement in sensitivity. However, when an incorrect symbol estimate is output by the slicer, error propagation occurs which lowers the estimated improvement to around 2 dB.

The symbol at the output of the differential detecting module at time t is:

$$y(t)=x(t)+n(t),$$

where x(t) is the actual transmitted phase and n(t) is noise.
At time t+1, x(t) is rotated by phase p(t), so:

$$x(t+1)=x(t)e^{i*p(t)}.$$

Therefore, the symbol at the output of the differential detecting module is:

$$y(t+1)=x(t)e^{i*p(t)}+n(t+1).$$

According to the present disclosure, noise averaging is performed for y(t) and y(t+1) assuming that the estimate on phase p(t) is correct. Therefore:

$$Y_{ave}=y(t+1)+y(t)e^{i*p(t)}$$

$$Y_{ave}=x(t+1)+\tfrac{1}{2}(n(t)+n(t+1)e^{i*p(t)}).$$

The noise term $\tfrac{1}{2}(n(t)+n(t+1)e^{i*p(t)}$ has variance reduced by half since n is assumed to be independent.

The noise averaging is continued progressively as the phase estimates are generated on the complete EDR portion of the packet. A forgetting factor is used to reduce error propagation in case of incorrect phase estimate. In one implementation, $$Y_{ave}=y(t+1)+n_{ave\_ff}*y(t)e^{i*p(t)}.$$

FIG. 6 illustrates a differential detection module 201 according to one embodiment of the present disclosure. Data symbols are oversampled and stored in buffer 490. The differential detection module 201 includes a differential calculating module 495 configured to perform differential detection on the symbols and to generate data bits. In addition, the differential calculating module 495 generates a phase estimate. A reconstruction module 500 generates a replacement symbol based on the phase estimate and the second symbol. The reconstruction module 500 adjusts the first symbol and the replacement symbol by weighting factors. The reconstruction module 500 generates a sum of the adjusted first symbol and the adjusted replacement symbol and replaces the first symbol with the sum. As described above, the reconstruction module 500 reduces noise by reducing or eliminating noise components.

More particularly, the differential calculating module 495 inputs a first sample D0 of a first symbol to a multiplier 502. A first sample D8 of a second symbol is output to a conjugate module 504, which provides a conjugate of the second symbol to a second input of the multiplier 502. While samples for D0 and D8 are used in this example with 8 times oversampling, other sampling rates can be used. More generally, samples D0 and DN are used for sampling at N times the signal rate. An output of the multiplier 502 is output to a delay module 508 that provides delay, a coordinate rotation digital computer (cordic) module 512 that performs a cordic function, and delay modules 516 and 520 that also provide delays. A frequency offset compensation module 524 receives an output of the delay module 520 and performs frequency offset compensation. An output of the frequency offset compensation module 174 is input to a slicer module 528, which slices the output of the delay module 520 and outputs the data bits.

In addition to outputting the data bits, the slicer module 528 also performs phase slicing and outputs a phase estimate p(t). The phase estimate is output to a rotating module 534, which rotates the phase estimate by $e^{i*p(t)}$. The rotating module 534 uses the phase estimate generated by the slicer module 528 to rotate the second symbol (formerly sample D8—now at sample D11 due to delays) by the phase estimate to generate a replacement symbol. The effect is to reduce one of the noise components, as described above.

The replacement symbol and the first symbol at time t+1 may be averaged or factored to provide noise averaging. Note that the buffer sample D3 is updated due to a delay in the data path from the buffer 490 to the slicer module 528. Therefore, the first symbol reaches D3 in the buffer 490 when the replacement symbol based on the phase estimate and the second symbol is ready.

Referring back to FIG. 6, the replacement symbol is generated by the second symbol at time t rotated by the phase estimate in the reconstruction module 500. Therefore, the rotation caused by the phase estimate $e^{i*p(t)}$ is multiplied in multiplying module 536 by symbol D11, which corresponds to the second symbol at D8 after three sample delays. An output of the multiplying module 536 is input to one input of a multiplying module 542. Another input of the multiplying module 542 receives a first factor, such as a forgetting factor M_edr_nave_ff. The sample D3 is divided by 2 by a dividing module 560, which has an output connected to a one input of a summing module 562. The other input of the summing module 562 receives an output of the multiplying module 542. The output of the summing module 562 is used to update the first symbol D3.

FIG. 7 illustrates an example of a method 600 for performing differential detection according to one implementation of the present disclosure. At 604, differential detection is performed and the data bits and the phase estimate are generated. At 606, a replacement symbol is generated based on the second symbol and the phase estimate. At 610, the replacement symbol is multiplied by a first factor. In some examples, the first factor is a forgetting factor as described above. At 616, the first symbol is divided by two (or multiplied by a second factor). At 620, control sums the first symbol divided by 2 is added to the replacement symbol multiplied by the first factor. At 624, the first symbol is replaced by the sum.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A demodulator for a Bluetooth receiver, the demodulator comprising:

a sampling module configured to oversample input symbols a first plurality of times to generate a plurality of oversampled input symbols, wherein each of the plurality of oversampled input symbols comprises a respective plurality of samples of a respective one of the input symbols; and a correlating module configured to receive a predetermined word, correlate a plurality of adjacent samples of each of the plurality of oversampled input symbols with corresponding bits in symbols of the predetermined word, and based on the correlation, selectively generate a synchronization signal indicating synchronization has occurred, wherein the plurality of adjacent samples of each of the plurality of oversampled input symbols comprises more than one sample and less than a number of samples in the corresponding one of the plurality of oversampled input symbols.

2. The demodulator of claim 1, wherein:

the Bluetooth receiver is configured to operate in a first data rate mode and a second data rate mode;

the sampling module is configured to sample the input symbols (i) at a first rate during the first data rate mode, and (ii) at a second rate during the second data rate mode;

sampling the input symbols at the first rate includes sampling each of the input symbols only once;

the oversampling of the input symbols comprises sampling the input symbols at the second rate; and the correlating module is enabled in the second data rate mode and disabled in the first data rate mode.

3. The demodulator of claim 1, wherein:

each of the plurality of oversampled input symbols includes 8 samples; and the plurality of adjacent samples of each of the plurality of oversampled input symbols includes 3 samples.

4. The demodulator of claim 1, wherein:

the correlation module includes a difference module; and the difference module is configured to generate differences based on (i) the plurality of adjacent samples of each of the plurality of oversampled input symbols, and (ii) the corresponding bits in the predetermined word.

5. The demodulator of claim 4, wherein:

the correlation module includes a multiplying module; and the multiplying module is configured to multiply the corresponding bits in the predetermined word by a first constant prior to the correlation module generating the differences.

6. The demodulator of claim 5, wherein the first constant is equal to 0.75.

7. The demodulator of claim 5, wherein the correlation module includes:

a first summing module configured to sum a first plurality of differences to generate a first sum;

a second summing module configured to sum a second plurality of differences to generate a second sum; and a plurality of dividing modules configured to divide each of the first sum and the second sum by a second constant.

8. The demodulator of claim 7, wherein the second constant is equal to 4.

9. The demodulator of claim 7, wherein:

the correlation module includes a third summing module; and the third summing module is configured to (i) sum outputs of the plurality of dividing modules, and (ii) generate a third sum.

10. The demodulator of claim 9, wherein:
the correlation module includes a comparing module; and
the comparing module is configured to
    compare the third sum to a predetermined threshold and selectively generate the synchronization signal based on the comparison.

11. The demodulator of claim 1, further comprising:
a first detection module configured to determine a first phase corresponding to a minimum distance from the predetermined word based on the synchronization signal; and
a second detection module configured to
    perform differential detection on a first symbol and a second symbol based on the first phase, wherein the second symbol occurs prior to the first symbol, wherein the plurality of oversampled input symbols comprise the first symbol and the second symbol, and
    estimate a second phase for the first symbol based on a result of the differential detection; and
a symbol replacement module configured to (i) generate a third symbol based on the second phase and the second symbol, and (ii) replace the first symbol based on the first symbol and the third symbol.

12. The demodulator of claim 11, further comprising a buffer configured to store the first symbol and the second symbol.

13. The demodulator of claim 11, wherein:
the second detection module includes a slicer module; and
the slicer module is configured to generate (i) data bits, and (ii) the second phase.

14. The demodulator of claim 11, wherein the symbol replacement module includes:
a rotator module configured to rotate the second phase to generate a rotated phase; and
a first multiplying module configured to multiply the rotated phase by the second symbol to generate the third symbol.

15. The demodulator of claim 14, further comprising a second multiplying module configured to multiply the third symbol by a first factor.

16. The demodulator of claim 15, further comprising:
a dividing module configured to divide the first symbol by a second factor; and
a summing module configured to sum (i) the first symbol divided by the second factor, and (ii) the third symbol multiplied by the first factor.

17. The demodulator of claim 16, wherein the symbol replacement module is configured to replace the first symbol with an output of the summing module.

18. The demodulator of claim 11, wherein the second detection module includes:
a conjugate module configured to generate a conjugate of the second symbol;
a multiplying module configured to multiply the first symbol by the conjugate of the second symbol;
a first delay module configured to delay an output of the multiplying module;
a cordic module configured to perform a cordic operation on an output of the first delay module;
a second delay module configured to delay an output of the cordic module;
a third delay module configured to delay an output of the second delay module;
a frequency offset compensation module configured to perform frequency compensation on an output of the third delay module; and
a slicer module configured to, based on an output of the frequency offset compensation module, (i) generate data bits, and (ii) estimate the second phase.

19. A method for performing demodulation via a Bluetooth receiver, the method comprising:
oversampling input symbols a first plurality of times to generate a plurality of oversampled input symbols, wherein each of the plurality of oversampled input symbols comprises a respective plurality of samples of a respective one of the input symbols; and
receiving a predetermined word;
correlating a plurality of adjacent samples of each of the plurality of oversampled input symbols with corresponding bits in symbols of the predetermined word; and
based on the correlation, selectively generating a synchronization signal indicating synchronization has occurred, wherein the plurality of adjacent samples of each of the plurality of oversampled input symbols comprises more than one sample and less than a number of samples in the corresponding one of the plurality of oversampled input symbols.

20. The method of claim 19, further comprising:
selectively operating the Bluetooth receiver in either a first data rate mode or a second data rate mode;
sampling the input symbols (i) at a first rate during the first data rate mode, and (ii) at a second rate during the second data rate mode, wherein sampling the input symbols at the first rate includes sampling each of the input symbols only once, and wherein the oversampling of the input symbols comprises sampling the input symbols at the second rate;
enabling the correlating of the plurality of adjacent samples of each of the plurality of oversampled input symbols during the second data rate mode; and
disabling the correlating of the plurality of adjacent samples of each of the plurality of oversampled input symbols during the first data rate mode.

21. The method of claim 19, further comprising generating differences based on (i) the plurality of adjacent samples of each of the plurality of oversampled input symbols, and (ii) corresponding bits in the predetermined word.

22. The method of claim 21, further comprising multiplying the corresponding bits in the predetermined word by a first constant prior to generating the differences.

23. The method of claim 19, further comprising:
determining a first phase corresponding to a minimum distance from the predetermined word based on the synchronization signal;
performing differential detection on a first symbol and a second symbol based on the first phase, wherein the second symbol occurs prior to the first symbol, wherein the plurality of oversampled input symbols comprise the first symbol and the second symbol;
estimating a second phase for the first symbol based on a result of the differential detection;
generating a third symbol based on the second phase and the second symbol; and
replacing the first symbol based on the first symbol and the third symbol.

24. The method of claim 23, further comprising generating (i) data bits, and (ii) the second phase.

25. The method of claim 23, further comprising:
rotating the second phase to generate a rotated phase; and
a first multiplying module configured to multiply the rotated phase by the second symbol to generate the third symbol.

26. The demodulator of claim 1, wherein the correlating module is configured to correlate the plurality of adjacent samples of each of the oversampled input symbols with a respective one of the symbols of the predetermined word.

* * * * *